United States Patent
Kohler et al.

(10) Patent No.: US 12,319,044 B1
(45) Date of Patent: Jun. 3, 2025

(54) MULTI-LAYER COMPOSITE ALIGNMENT DEVICE

(71) Applicant: KOHLAM, LLC, Uniontown, OH (US)

(72) Inventors: Herbert B. Kohler, Uniontown, OH (US); Stefan Wick, Oberbuchsiten (CH)

(73) Assignee: KOHLAM, LLC, Uniontown, OH (US)

( * ) Notice: Subject to any disclaimer, the term of this patent is extended or adjusted under 35 U.S.C. 154(b) by 0 days.

(21) Appl. No.: 18/763,092

(22) Filed: Jul. 3, 2024

Related U.S. Application Data

(60) Provisional application No. 63/626,359, filed on Jan. 29, 2024.

(51) Int. Cl.
  *B32B 38/18* (2006.01)
  *B32B 37/18* (2006.01)
  *B65H 9/16* (2006.01)

(52) U.S. Cl.
  CPC .......... *B32B 38/1833* (2013.01); *B32B 37/18* (2013.01); *B65H 9/166* (2013.01)

(58) Field of Classification Search
  None
  See application file for complete search history.

(56) References Cited

U.S. PATENT DOCUMENTS

| | | | |
|---|---|---|---|
| 6,666,451 B2 | 12/2003 | Leys et al. | |
| 6,715,755 B2 | 4/2004 | Sussmeier | |
| 6,811,152 B2 | 11/2004 | Delfosse et al. | |
| 6,910,689 B2 | 6/2005 | Carolan | |
| 7,325,802 B2 | 2/2008 | Asakawa et al. | |
| 7,611,142 B2 | 11/2009 | Kawashima et al. | |
| 7,878,503 B2 | 2/2011 | Deckard | |
| 8,066,282 B2 | 11/2011 | Andreas et al. | |
| 8,083,228 B2 | 12/2011 | deJong et al. | |
| 8,215,855 B2 | 7/2012 | Jacobsen et al. | |
| 8,297,616 B2 | 10/2012 | Tharayil | |
| 8,382,105 B2 | 2/2013 | Compera et al. | |
| 8,459,640 B2 | 6/2013 | Ui | |
| 8,480,081 B2 | 7/2013 | Inoue | |

(Continued)

FOREIGN PATENT DOCUMENTS

| | | |
|---|---|---|
| CN | 111344239 | 6/2020 |
| EP | 2305463 | 4/2011 |

(Continued)

OTHER PUBLICATIONS

Young Shin USA Limited, Stock Slotf brochure for Stock Maschinenbau, 6 pages.

(Continued)

*Primary Examiner* — Michael N Orlando
*Assistant Examiner* — Abhishek A Patwardhan
(74) *Attorney, Agent, or Firm* — Tucker Ellis LLP

(57) ABSTRACT

Disclosed is an alignment device capable of making high-speed adjustments to successive top sheets relative to underlying backings as they are conveyed toward an application station for lamination, in order to ensure that each successive top sheet is properly aligned prior to being laminated to its backing. In desirable embodiments, the alignment device can achieve successive angular corrections at a rate of at least 13,000 top sheets per hour.

17 Claims, 16 Drawing Sheets

(56) References Cited

U.S. PATENT DOCUMENTS

| | | | |
|---|---|---|---|
| 8,579,777 | B2 | 11/2013 | Hatano et al. |
| 8,851,471 | B2 | 10/2014 | Yamazaki |
| 8,882,106 | B2 | 11/2014 | Maenishi et al. |
| 8,944,432 | B2 | 2/2015 | Karikusa |
| 9,011,617 | B2 | 4/2015 | Mayer et al. |
| 9,346,182 | B2 | 5/2016 | Horii et al. |
| 9,358,769 | B2 | 7/2016 | Elzeftawi |
| 9,856,101 | B2 | 1/2018 | Mizuno |
| 10,370,212 | B1 | 8/2019 | Atwood et al. |
| 10,384,429 | B2 | 8/2019 | Gygi et al. |
| 10,479,630 | B2 | 11/2019 | Rietbergen et al. |
| 10,486,404 | B2 | 11/2019 | Jing |
| 10,717,258 | B2 * | 7/2020 | Meckelein .............. B32B 37/22 |
| 10,723,114 | B1 | 7/2020 | Liu |
| 10,730,713 | B2 | 8/2020 | Matsuda et al. |
| 10,773,912 | B2 * | 9/2020 | Beskitt ................... B65H 9/101 |
| 10,940,637 | B2 | 3/2021 | Kackmann-Schneider et al. |
| 11,447,353 | B2 | 9/2022 | Wick |
| 11,472,652 | B2 | 10/2022 | Koekebakker et al. |
| 11,679,582 | B2 | 6/2023 | Fujita et al. |
| 2005/0109450 | A1 | 5/2005 | Skoglund et al. |
| 2009/0152806 | A1 | 6/2009 | Buddendeck et al. |
| 2010/0043980 | A1 | 2/2010 | Sleijpen et al. |
| 2010/0314217 | A1 | 12/2010 | Asari et al. |
| 2013/0043294 | A1 | 2/2013 | Nishizawa et al. |
| 2014/0357463 | A1 | 12/2014 | Kojima |
| 2015/0344347 | A1 | 12/2015 | Fleming et al. |
| 2017/0087817 | A1 | 3/2017 | Tomaki et al. |
| 2021/0354948 | A1 * | 11/2021 | Takahashi .......... G03G 21/1638 |
| 2022/0131175 | A1 | 4/2022 | Lee et al. |
| 2023/0009594 | A1 | 1/2023 | Aron et al. |
| 2023/0080579 | A1 | 3/2023 | Suzuki et al. |
| 2023/0158787 | A1 | 5/2023 | Monfredini et al. |

FOREIGN PATENT DOCUMENTS

| | | |
|---|---|---|
| EP | 1734414 | 11/2016 |
| EP | 3348504 | 2/2021 |
| FR | 2857655 | 1/2005 |
| WO | 2022091079 | 5/2022 |

OTHER PUBLICATIONS

International Search Report and Written Opinion in PCT/US2024/036373, dated Oct. 21, 2024 (13 pages).

* cited by examiner

MULTI-LAYER COMPOSITE ALIGNMENT DEVICE

CROSS-REFERENCE TO RELATED APPLICATIONS

This application claims the benefit of U.S. provisional patent application Ser. No. 63/626,359 filed Jan. 29, 2024, the contents of which are incorporated herein by reference.

BACKGROUND OF THE INVENTION

Multi-layer composites (an example of which is shown schematically in FIG. 1) are often used to produce high-end packaging for goods. With reference to FIGS. 1-2 (FIG. 2 depicting a cross-sectional view along the line 2-2 in FIG. 1), an example of a multi-layer composite 100 is shown, and includes a top sheet 102 (or first sheet) disposed on a backing 104 (or second sheet). Notably, in the illustrated embodiment, the dimensions of the top sheet 102 (i.e., length and width) are substantially the same as that of the backing 104. However, the dimensions of the top sheet 102 may differ with respect to those of the backing 104.

The top sheet 102 is adhered to the backing via an adhesive 106 (the thickness of the adhesive 106 being exaggerated in FIG. 2 for illustrative purposes). The top sheet 102 may have high-quality indicia printed thereon (e.g., via flexography, photogravure or offset printing) such that after the top sheet 102 is adhered to the backing 104, the multi-layer composite 100 can be folded to produce packaging (e.g., a gift box) with the high-quality indicia displayed on its external surface.

Moving now to FIG. 3, one example of a laminating machine 108 for manufacturing the multi-layer composite 100 is shown schematically. The laminating machine 108 includes first and second conveyors 110, 112 (e.g., conveyor belts, rollers, etc.) for respectively conveying the top sheet 102 and the backing 104 from respective upstream sources (not shown) towards an application station 114 where the top sheet 102 is adhered to the backing 104. Of note, a plurality of top sheets 102 are shingled with respect to one another and conveyed in this manner (on the first conveyor 110) toward the application station 114. Additionally, a plurality of backings 104 are spaced apart from one another (in the conveyance direction) on the second conveyor 112 and conveyed in this manner towards the application station 114. The backings 104 may have the adhesive 106 (not shown) applied on a surface thereof prior to reaching the application station 114. Notably, while FIG. 3 depicts separate backings 104 being conveyed via the second conveyor 112, it is contemplated that a continuous backing web can be conveyed along the second conveyor 112, where discrete portions thereof are cut (prior to entering the application station 114) to form discrete backings, each corresponding to a respective top sheet 102 that is to be applied thereto.

Prior to adhering each top sheet 102 to the respective backing 104, the top sheet 102 must be properly aligned relative thereto so that the top sheet 102 and its backing 104 will be affixed in the correct alignment. In the illustrated example, the dimensions of the top sheet 102 and the backing 104 are the same, and thus the desired alignment will require that the top sheet 102 be disposed and oriented in register with the backing 104 so that their adjacent edges are essentially co-extensive. While the backings 104 typically will be uniformly and precisely aligned (usually centered with respect to a center line 116 of the machine 108) on the second conveyor 112, that is not usually the case for the respective top sheets 102 advancing along the first conveyor 110.

For example, with respect to FIGS. 4A-4C (depicting schematic top views of a top sheet 102 and the associated backing 104), the top sheet 102 may be: (1) angularly offset with respect to the backing 104 (i.e., FIG. 4A), as initially supplied along the first conveyor 110; (2) laterally offset with respect to the backing 104 (i.e., FIG. 4B) as initially supplied; and/or longitudinally offset with respect to the backing 104 (i.e., FIG. 4C) as initially supplied. As such, when the top sheet 102 is angularly offset, its own center line may be at an oblique angle relative to the center line 116 of the machine 108; and thus to that of the associated backing 104. Lateral offset refers to the top sheet 102 being laterally displaced, i.e., along a direction perpendicular to the center line 116 of the machine 108 (and thus to the conveyance direction), when the top sheet 102 and the backing 104 are properly angularly aligned. Longitudinal offset refers to the top sheet 102 being either advanced or retarded relative to the associated backing 104 along the conveyance direction when they are properly angularly aligned.

It is routine for the shingled top sheets 102 riding along the first conveyor 110 toward the application station 114 to be misaligned relative to the respective intended backings 104 riding along the second conveyor toward that station 114. There is a need for an alignment device that can adjust one or more of the angular, lateral and longitudinal alignment of each top sheet 102 as it advances toward the application station 114, so that upon arrival at that station 114 it will be properly aligned with respect to the intended backing 104, angularly, laterally and longitudinally, prior to their being adhered together. When the two have the same shape and dimensions, typically proper alignment will mean that the top sheet 102 will be in register with the backing 104.

DESCRIPTION OF EXAMPLE EMBODIMENTS

Figures 4A, 4B, 4C:
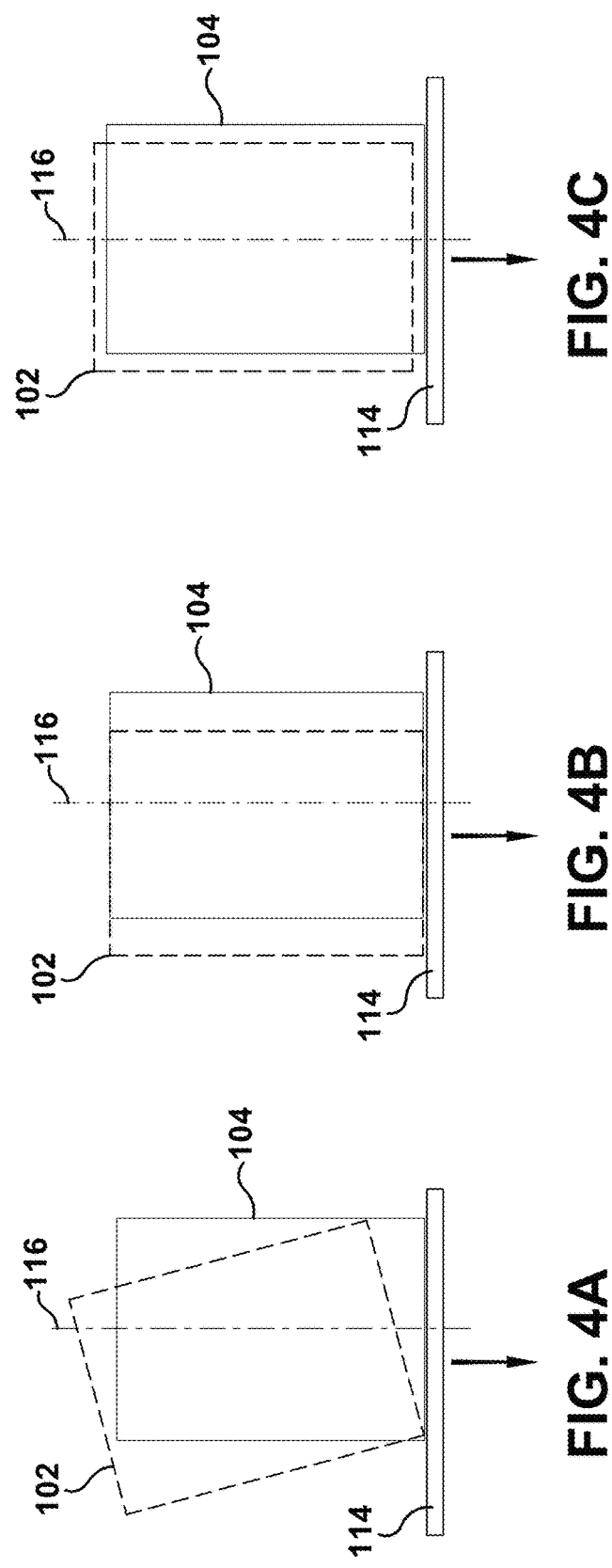
FIGS. 4A-4C depict schematic top views of a top sheet and an associated backing sheet used to make a multi-layer composite as herein disclosed, in different states of misalignment.

In the example misalignments shown in FIGS. 4A-4C, both the top sheet 102 and the backing 104 are shown as rectangular having linear edges, and having substantially the same dimensions. But this is not required, and it will be appreciated that different-sized and shaped top sheets 102 and backings 104 can be used (including different from one another), the only requirement being that the desired final alignment between top sheet 102 and backing 104 has been determined in advance so that the alignment device described herein can be operated to place each top sheet 102 in proper alignment prior to adhering it to the associated backing 104.

Figure 1:
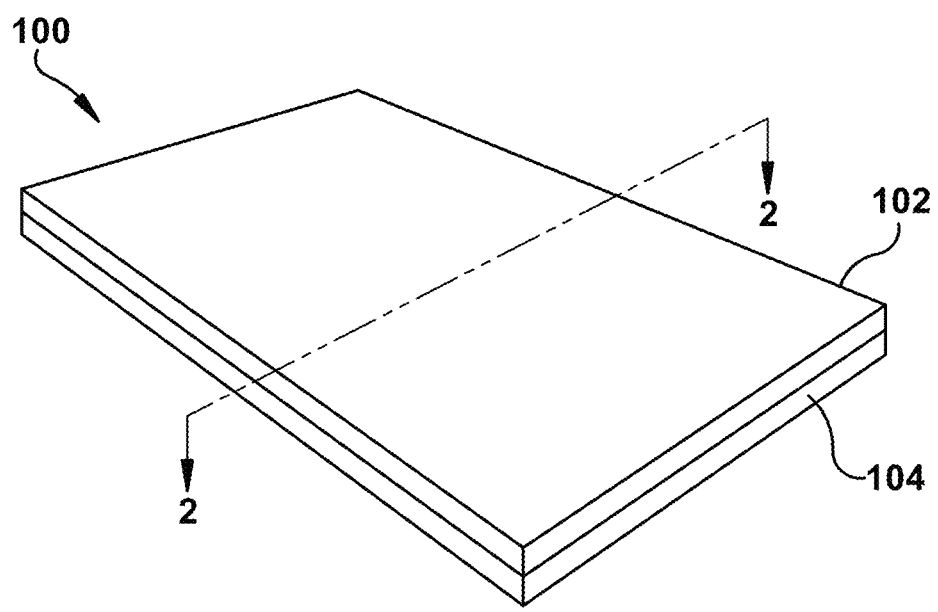
FIG. 1 shows an example multilayer composite used to produce high-end packaging for goods.
Figure 2:
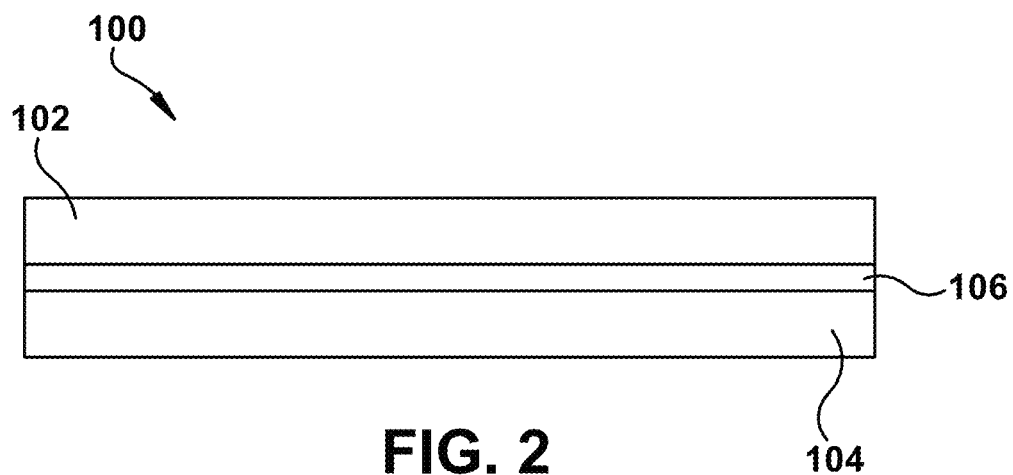
FIG. 2 is a cross section of the multilayer composite shown in FIG. 1.
Figure 3:
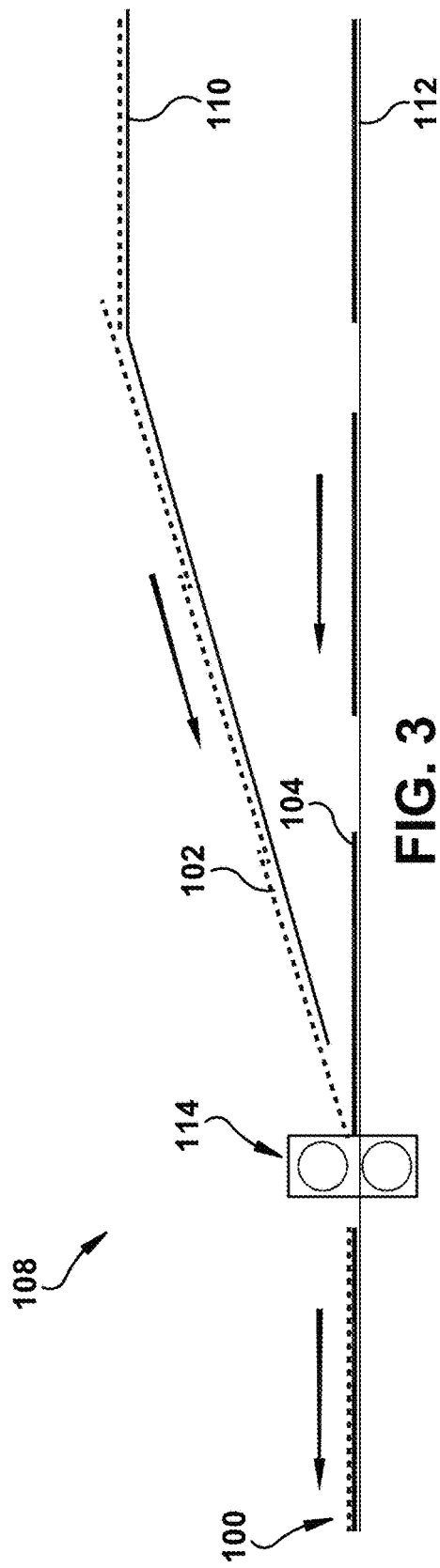
FIG. 3 shows a schematic diagram of an example laminating machine for manufacturing a multi-layer composite.
Figure 5:
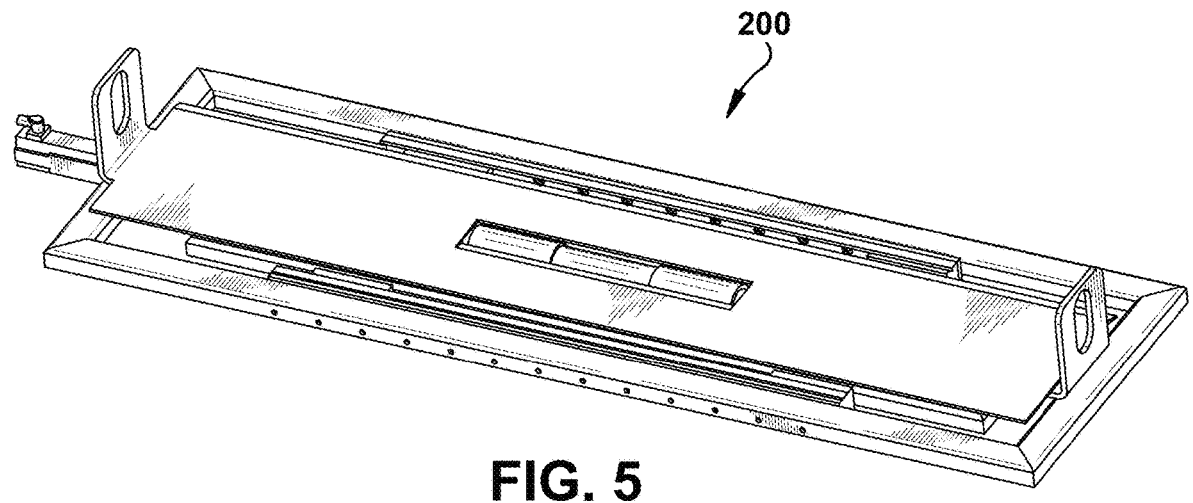
FIG. 5 shows a first embodiment of an alignment device as herein disclosed, fully assembled.
Figure 6:
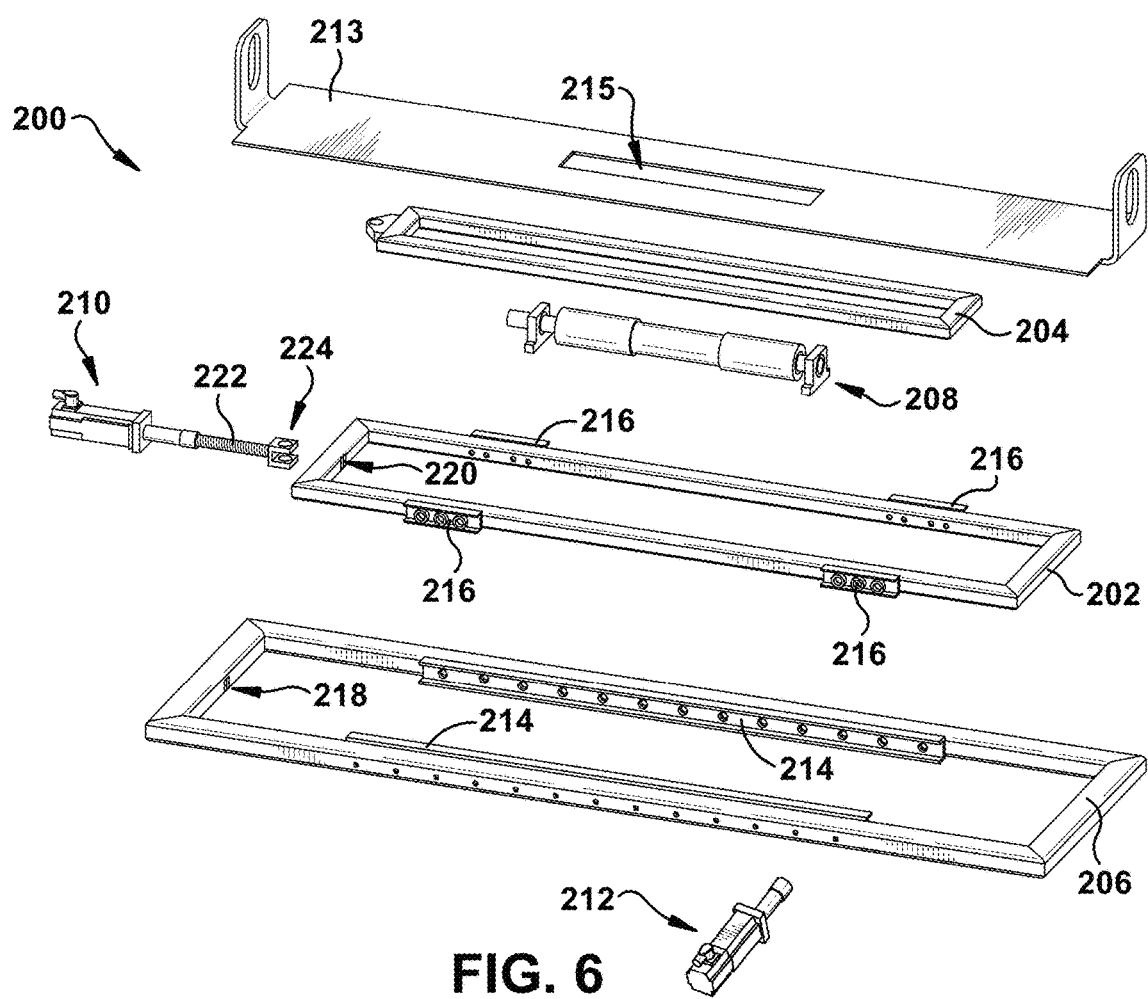
FIG. 6 shows an exploded view of the alignment device shown in FIG. 5.

With reference to FIGS. 5-6, illustrated is a first embodiment of an alignment device 200 which can be used to correct misalignment (as described above) between the top sheet 102 and the backing 104. Notably, this alignment device 200 may be incorporated or retrofitted into a conventional laminating machine 108 such as that shown schematically in FIG. 3 (see FIG. 13). In the illustrated embodiment, as best seen in FIG. 6 (which is an exploded view) the alignment device 200 has a nested frame assembly, including a first frame 202, a second frame 204, and a third frame 206. Each of these frames 202, 204, 206 is shown as rectangular and open at its center to permit another element to reside therein. More specifically, the second frame 204 is received in the central opening of the first frame 202, which is received in the central opening of the third frame 206. Accordingly, in the illustrated embodiment the first, second, and third frames 202, 204, 206 are intermediate, inner, and outer frames, respectively, of the nested frame assembly in the illustrated embodiment. Additionally, the intermediate, inner, and outer frames 202, 204, 206 are coplanar when assembled as-illustrated in FIG. 5, but this is not required.

The alignment device 200 further includes a roller assembly 208 attached to the inner frame 204. The inner frame 204 is movable via a first actuator 210 and/or a second actuator 212 to correct angular misalignment of the top sheet 102 with respect to a corresponding backing 104, as will be further discussed below. As further shown, a plate 213 is provided and includes an aperture 215. In use, the alignment device 200 is installed in or to the laminating machine 108 so that the outer frame 202 of the alignment device 200 is fixed with respect to the laminating machine, preferably so that its long axis (e.g. a centerline parallel to its length dimension) is parallel to a cross-machine direction of the laminating machine 108, and perpendicular to a conveyance direction thereof. Also as-installed, the upper surface of the plate 213 will be substantially co-planar with the upper surface of the first conveyor 110. In this manner, as that conveyor 110 advances top sheets 102 forward, those sheets are conveyed onto an area above the plate 213; i.e. over the upper surface of that plate 213. The aperture 215 in the plate 213 is aligned with the roller assembly 208, whose roller(s) thus will engage with the underside surface of top sheets 102 as they are advanced above the plate 213. Engagement of each top sheet 102 by the roller assembly 208 will enable the latter to make adjustments to the alignment of that top sheet 102 as it passes over the plate 213, by correspondingly adjusting the angle and orientation of the inner frame 206 that carries the roller assembly as hereafter described.

Figure 7:
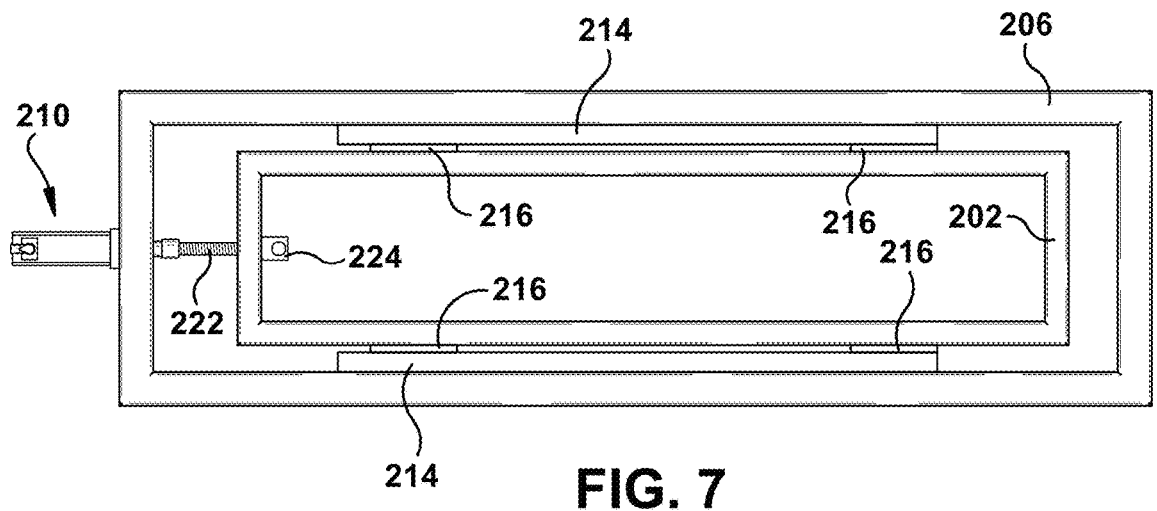
FIGS. 7 and 8 are top and perspective views, respectively, of a nested frame assembly of the example alignment device of FIG. 5, having outer and intermediate frames 206, 202.
Figure 8:
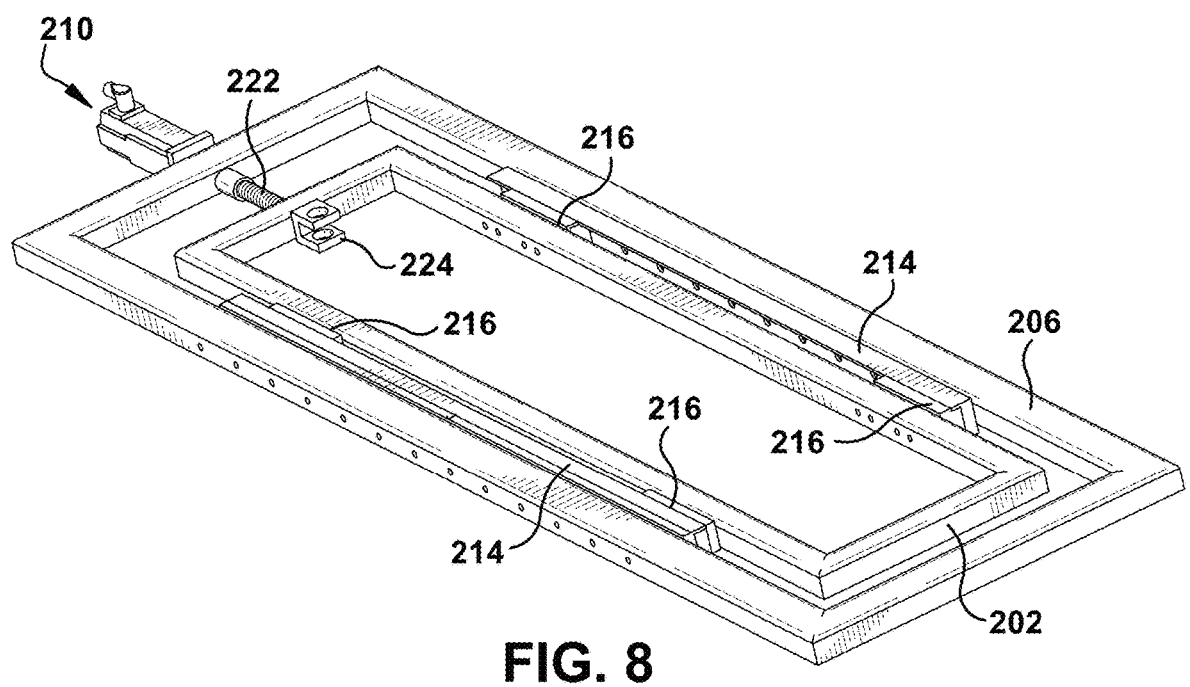

Moving now to FIGS. 7-8, the intermediate frame 202 is received within the central opening of the outer frame 206 and is movably secured therein via a sliding assembly. In the illustrated example, the sliding assembly includes a pair of rails 214, each configured to slidably receive a corresponding pair of carriages 216 therein. Notably, the pair of rails 214 are provided on and secured (e.g., via bolts, screws, etc.) to opposing, inner edges of the outer frame 206, and each pair of carriages 216 is provided on and secured to opposite, outer edges of the intermediate frame 202. Accordingly, each pair of carriages 216 is configured to be received within and slide along their corresponding rail 214 to permit linear translation of the intermediate frame 202 with respect to the outer frame 206 along a single direction, which will be the cross-machine direction; i.e., perpendicular to the center line 116 (and to the conveyance direction) of the laminating machine 108 when viewed from above.

Returning to FIG. 6, the outer and intermediate frames 206, 202 have respective through-holes 218, 220 formed therein in registry with one another (when assembled). Notably, these through-holes 218, 220 define a common path configured to receive a shaft 222 of the first actuator 210 (as shown in FIGS. 7-8). When assembled, the first actuator 210 is positioned such that its shaft 222 successively penetrates both the through-holes 218, 220 starting from outside the outer frame 206, so that a distal end of the shaft 222 emerges just within the central opening of the intermediate frame 202. Thereafter, a bracket 224 can be assembled to the distal end of the shaft 222 (opposite the actuator's motor) that has emerged within the central opening of the intermediate frame 202. As shown, the bracket 224 can be substantially U-shaped, having corresponding (i.e., coaxial) apertures formed in opposing walls thereof extending inward within the central opening of the intermediate frame 202, which apertures are adapted to receive a hinge-pin as discussed further below. Alternatively, the bracket 224 can be affixed to an interior edge of the intermediate frame 202 in another way; e.g. via adhesive, fasteners, welding, etc. Likewise, the distal end of the shaft of the first actuator 210 can be affixed to the intermediate frame 202 (e.g. to an exterior edge thereof, opposite to the location of the bracket 224) other than via the bracket 224, such as via adhesive, other fasteners, welding, etc.

The first actuator 210 is operable to actuate the intermediate frame 202 in order to translate it along the cross-machine direction (as described above) within the confines of the outer frame 206 within which it is nested. In the illustrated embodiment, the first actuator 210 is a linear actuator that translates the intermediate frame 202 linearly (in the cross-machine direction) with respect to the outer frame 206, which can be stationary and fixed relative to the laminating machine 108. However, it is contemplated that other conventional actuators may be used to provide adjustable linear translation of the intermediate frame 202.

Figure 9:
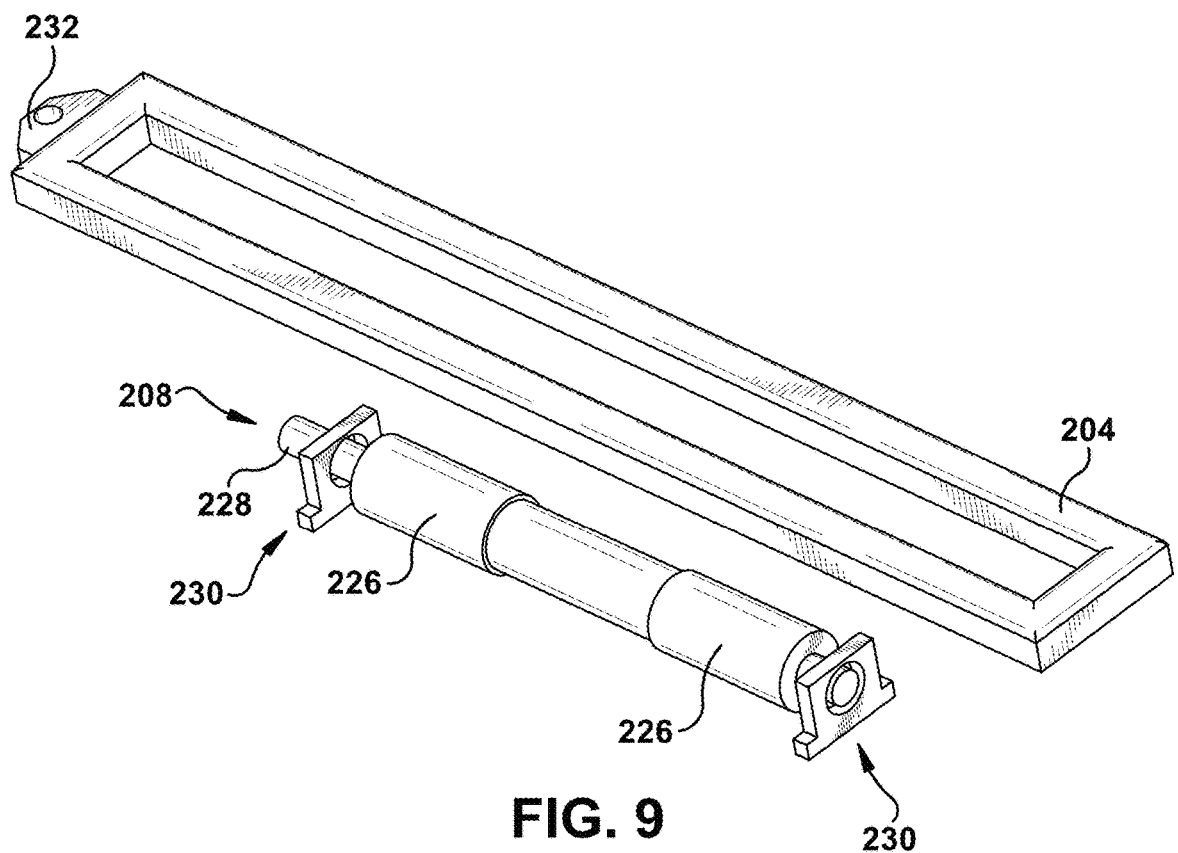
FIGS. 9 and 10 show a roller assembly associated with an inner frame 204 of a nested frame assembly, wherein in FIG. 9 the roller assembly is separated from the inner frame and in FIG. 10 it is attached to the inner frame.
Figure 10:
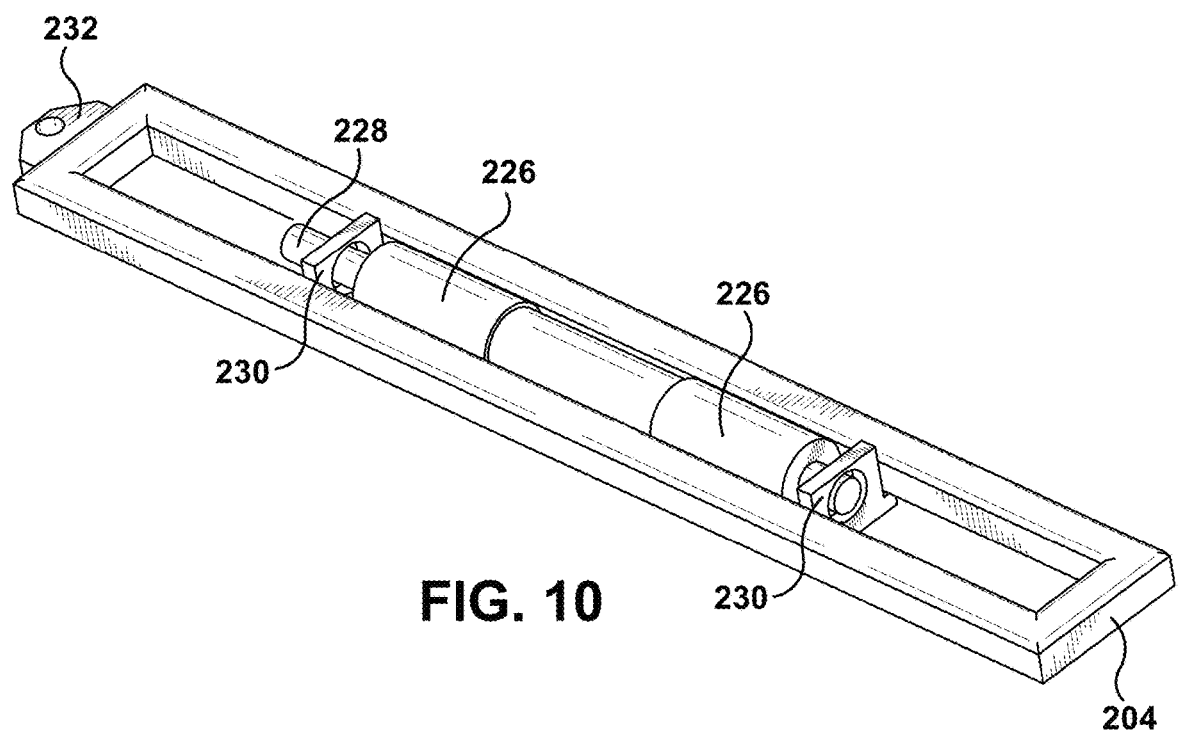

Moving on to FIGS. 9-10, the roller assembly 208 includes one or more rollers 226 (which are coaxial in case of two or more) provided on (i.e., fixed to) a common axle 228, which is rotatable via a motor (not shown). The motor can be integrated and housed within the inner frame 204, e.g. so that its drive shaft is coupled to, or forms an extension of, the common axle 228 in order to drive that axle. Alternatively, the motor can be located remotely and coupled to the common axle 228 via a suitable gear train and/or belts or chains in order to drive that axle. Accordingly, when the associated motor is activated, the roller(s) 226 is/are driven in rotation via the axle 228, and at the same speed when there are two or more such rollers. Notably, in the illustrated embodiment, there is a single roller 226 having a radially recessed central region that will not contact the overlying top sheet 102 in-use. However, there may be two (or more) such rollers 226 axially spaced from one another and which are separately manufactured and fixed on the common axle 228. Alternatively, it is contemplated that the rollers 226 need not be placed on a common axle. For example, rollers 226 may be placed on distinct, preferably co-axial axles that are separately driven by respective motors. Whichever of the foregoing configurations is used, the result will be that each top sheet 102 will be engaged at two distinct locations, spaced from one another in a direction along the length of the axle 228, preferably colinear with a pivot axis of that axle (described below). Engaging the top sheet 102 at two distinct, spaced locations can impart better angular-adjustment control over each such sheet 102 as the roller(s) 226 pivot (discussed below). That is, engaging two distinct locations on the top sheet 102, spaced from one another, to rotate the sheet 102 either clockwise or counter-clockwise, as the case may be, will yield greater rotational control and adjustment resolution than would be achieved if the torque to induce such rotation were to be introduced substantially by a single roller at a single (or center-focused) location. Alternatively, though less preferably, a single uniform-diameter roller 226 can be used to engage the top sheets 102.

Figure 11:
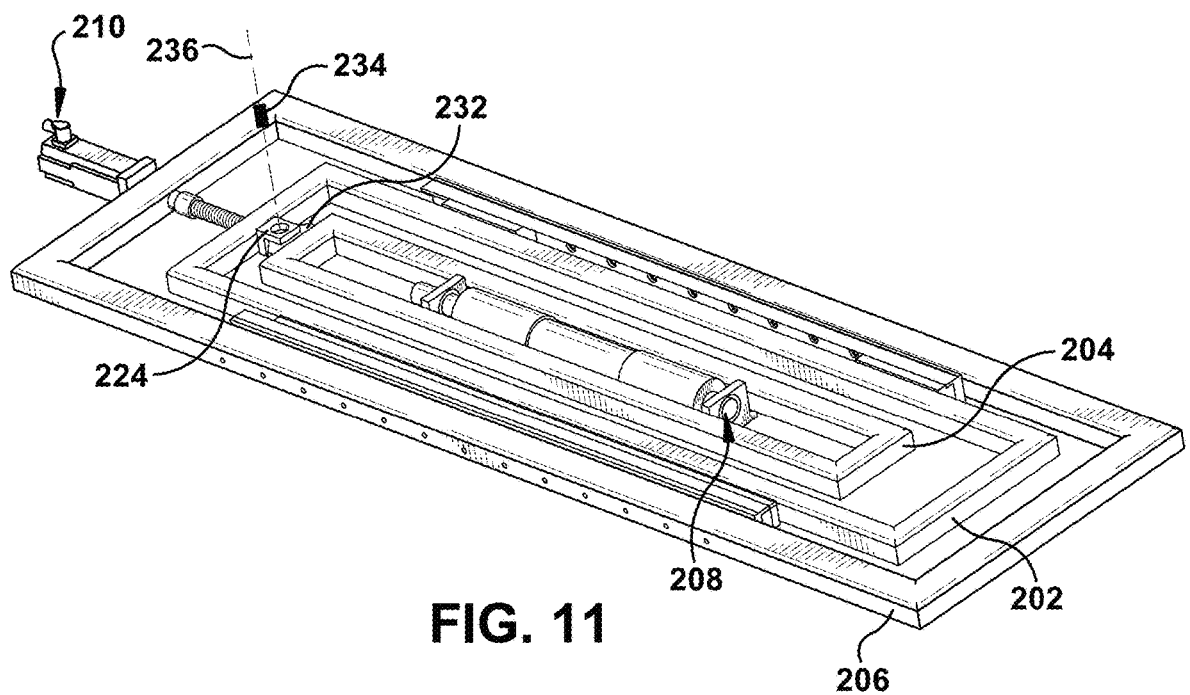
FIGS. 11 and 12 are perspective and top views, respectively, of a nested frame assembly having outer, intermediate and inner frames 206, 202 and 204, as well as the aforementioned roller assembly 208.
Figure 12:
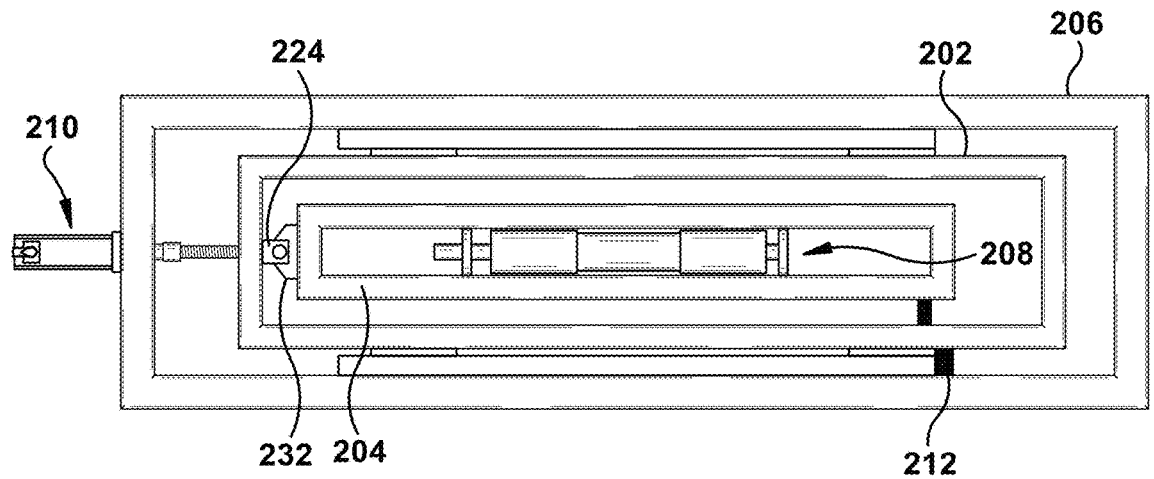

As further shown, the roller assembly 208 is attached to the inner frame 204 via mounts 230. Notably, the mounts 230 are located on opposite sides of the roller(s) 226, respectively, and rotatably support their common axle 228, or in selected embodiments respective but coaxial axles for distinct rollers. Moreover, a tab 232 protrudes outwards from an outer edge or surface of the inner frame 204 (i.e., at one of its longitudinal ends) and has an aperture formed therein. With reference to FIGS. 11-12, the bracket 224 (affixed to either the distal end of the shaft 222 of the first linear actuator 210, or to an interior surface of the intermediate frame 202) can be pivotally affixed to the tab 232 so that the entire inner frame 204 can pivot relative to a pivot axis 236 defined at the bracket 224. Specifically, the U-shaped bracket as shown in the illustrated embodiment receives the tab 232 between the opposing walls thereof such that the apertures in the opposing walls of the bracket 224 and the aperture in the tab 232 are aligned. With these apertures aligned (as shown in FIG. 12), a hinge pin 234 is inserted therein to pivotally link them together and establish a hinged-connection. With the hinge pin 234 in place, the inner frame 204 is pivotable about the pivot axis 236 via activation of the second actuator 212 (shown schematically in FIG. 12). Because the hinged-connection is provided at a longitudinal end of the inner frame 204, the pivot axis 236 is laterally offset with respect to the roller assembly 208.

The second actuator 212 may be a linear actuator (similar to the first actuator 210), having a shaft whose distal end is secured to the inner frame 204 remote from the pivot axis 236 so that actuation thereof will induce a pivoting movement of the inner frame 204 relative to the pivot axis 236. The second actuator 212 can be affixed to the intermediate frame so that it remains fixed relative thereto as the intermediate frame (and correspondingly, the inner frame nested therein) is (are) translated along the cross-machine direction via the first actuator 210. Notably, the bracket 224 both can be secured to the intermediate frame 202 in order to supply translational movement thereto upon actuation of the first actuator 210, and also provides the pivot point for the inner frame 204 (and thus the roller assembly 208 therein). In this manner, both the intermediate and inner frames 202, 204 will translate together as a single sub-assembly upon actuation of the first actuator 210, with the pivot point for the inner frame 204 also being fixed relative to the intermediate and inner frames 202, 204 as they translate in the cross-machine direction relative to the outer frame 206. In this manner, both the intermediate and inner frames 202, 204 will translate together, whereas the inner frame 204 will be independently pivotable relative to (and within the confines of) the intermediate frame 202, regardless of the cross-machine-direction position thereof based on the state of the first actuator 210.

As noted above, the second actuator 212 may be secured to the intermediate frame 202 in order to translate together therewith (and thus maintain its registration with the inner frame 204). Alternatively, the second actuator 212 may be secured in a different manner that allows the second actuator 212 to translate together with the inner frame 204 when the first actuator 210 is activated.

The plate 213 is attached to the inner frame 204 and is oriented such that its aperture 215 is aligned with the rollers 226, which protrude just through that aperture 215 so that they may engage a top sheet 102 passing over the plate 213. Because the plate 213 is attached to the inner frame 204, the plate 213 likewise translates and/or pivots in accordance with movement of the inner frame 204 subject to the operation of both the first and second actuators 210, 212. Alternatively, it is contemplated that the plate 213 can be attached to the intermediate frame 202 or the outer frame 206, so long as the aperture 215 is dimensioned as to not impede movement of the roller assembly 208 during translation and/or pivoting movement(s).

In sum, the nested frame assembly as described above facilitates both linear translation of the roller assembly 208 in a direction transverse to the conveyance direction of the top sheet (i.e., in the cross-machine direction), and pivoting of the same about the pivot axis 236, both with respect to the stationary outer frame 206. The degrees of translation and pivotal movement for the roller assembly also are confined to be within predefined limits. For example, in the illustrated embodiment the degree of pivoting of the roller assembly 208 is confined within the central opening of the intermediate frame, relative to its pivot axis 236. Whereas the degree of translation of the roller assembly 208 is confined within the range that the intermediate frame 202 (and the inner frame 204 nested therein) can translate within the central opening of the outer frame 206. Notably, both the translation and the pivotal movement of the roller assembly 208 also are confined within a plane that includes the rotational axis of the roller(s) 226 of the roller assembly 208.

When the first actuator 210 is activated, the intermediate frame 202 linearly translates within the central opening of the outer frame 206, with its movement guided and bounded by the slide assembly. As the first actuator 210 is also connected to the inner frame 204 (i.e., via the connection between the bracket 224 and the tab 232), the inner frame 204 (and thus the roller assembly 208) simultaneously translates together with the intermediate frame 202 in the cross-machine direction. Moreover, when the second actuator 212 is activated, the inner frame 204 (and thus the roller assembly 208) is pivoted about the pivot axis 236 within the central opening of the intermediate frame 202. In other words, the inner frame 204 (and thus the roller assembly 208) is capable of both linear and pivoting movement, whereas the intermediate frame 202 is only capable of linear movement with respect to the outer frame 206, which remains stationary.

Figure 13:
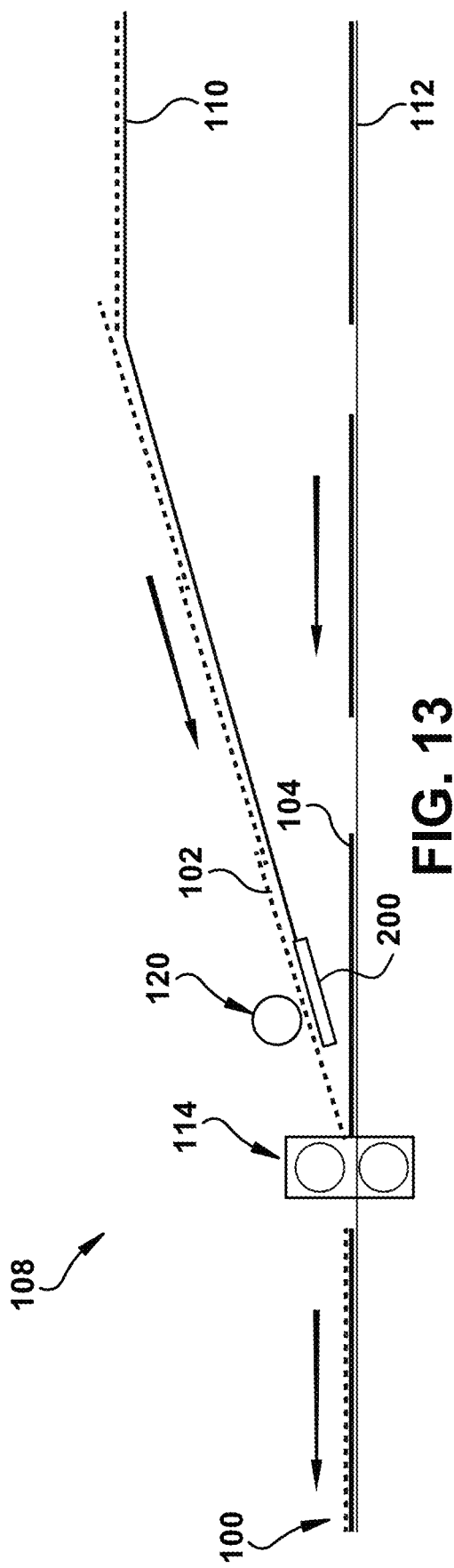
FIG. 13 shows a schematic diagram of an example laminating machine for manufacturing a multi-layer composite, wherein an alignment device is installed at or near an end of a first conveyor of the laminating machine, upstream of an application station where top sheets riding along the first conveyor are to be laminated to backings riding along a second conveyor.

A method of using the alignment device 200 to correct an orientation of an incoming top sheet to yield the desired alignment/registration relative to its corresponding backing will now be described. With reference to FIG. 13, the alignment device 200 is installed at (or near) the end of the first conveyor 110 along the conveyance direction, just upstream from the application station 114. Preferably the alignment device 200 is located at an inclined portion of the first conveyor 110 that is angled relative to the second conveyor 112 (which is substantially planar) along a convergent path relative to the second conveyor 112. As schematically shown, at least one nip roller 120 is aligned with the alignment device 200 in order to engage an opposite, upper surface of an incoming top sheet 102 relative to the roller(s) 226 of the underlying roller assembly 208. In operation, the top sheet 102 proceeds through the nip defined between the nip roller 120 and the roller(s) 226 of the alignment device 200, in order that the latter will engage and be operative to drive the top sheet 102 to make the adjustments described herein. The nip roller 120 may be actively rotatable by a corresponding motor, or it may be a passive roller.

As previously mentioned, the incoming backing 104 is typically properly aligned. Preferably, a (longitudinal) center line of the backing 104 is aligned relative to the (longitudinal) center line of the machine (e.g., in a common vertical plane when viewed from above). Accordingly, to effectuate the desired registration between an incoming top sheet 102 and its corresponding backing 104, the incoming top sheet 102 must be aligned relative to the associated backing 104. In conventional embodiments wherein the top sheet 102 and backing 104 are laterally symmetrical (e.g., rectangular) and the backing 104 has its center line aligned with the machine center line 116, then the machine center line 116 can be used as a landmark against which the top sheet 102 itself must also be aligned and centered. In the case of identically dimensioned, rectangular top sheets 102 and backings 104, it also means that the leading edge of the top sheet 102 must be aligned relative to the leading edge of the backing 104 (e.g., in a common vertical plane when viewed from above) prior to being affixed in the application station 114.

The following method description relies on aligning the center line 102a of each respective top sheet 102 with the center line 116 of the machine as described above to achieve suitable angular and lateral alignment. This is valid in the case of laterally symmetric (e.g., rectangular) top sheets 102 wherein the underlying backings 104 also are aligned laterally and angularly with the machine center line 116 in a known way. But it is to be recognized that the machine center line 116 is an arbitrary landmark against which to achieve such alignment, and that any suitable landmark can be used to achieve proper alignment so long as the landmark has been pre-calibrated with the lateral and angular alignment of the underlying backing 104 on the second conveyor 112. Likewise, utilizing the centerline 102a of the top sheets 102 also is arbitrary, and alignment can be made with respect to any predetermined feature of those sheets 102, so long as it is fixed with respect to the individual sheets and their particular shape/geometry. For example, an irregular-shaped, non-symmetric top sheet might be aligned with respect to a particular known edge whose position and angle is fixed with respect to the top sheet 102, and thus can be used to align the top sheet 102 as desired relative to a suitable pre-calibrated landmark.

Figure 14:
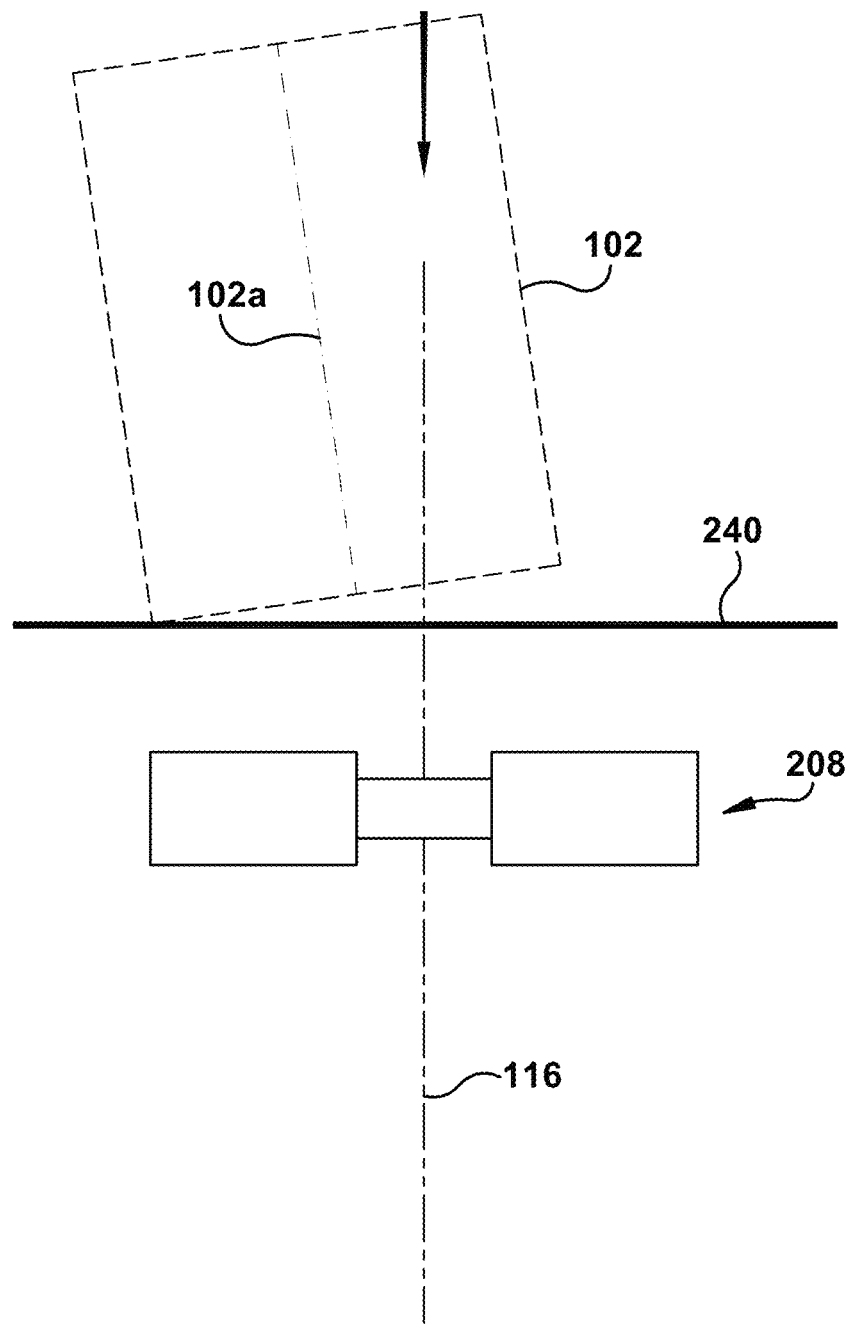
FIGS. 14-17 schematically illustrate example steps of aligning an initially mis-aligned topsheet using an alignment device as herein disclosed.

Referring to FIG. 14 (and to symmetric, rectangular top sheets 102), an incoming top sheet 102 is oriented, for example, such that its center line 102a is both angularly and laterally offset relative to the center line 116 of the machine (in the conveyance direction). In other words, the illustrated topsheet 102 is misaligned, and its alignment will need corrected prior to affixing to an underlying backing 104 at the application station 114 downstream. Notably, a sensor is provided upstream of the alignment device 200 (i.e., upstream of the roller assembly 208) and detects a leading edge of the top sheet 102 at a predetermined location. As will be described below, the sensor is configured to relay detected information to a controller (e.g., a programmable logic controller, not shown) for determining angular and lateral offsets of the center line 102a of the top sheet 102 relative to the center line 116 of the machine. In the illustrated embodiment, the sensor utilizes a laser plane 240, which is oriented orthogonal to the conveyance direction. Accordingly, when the leading edge of the traveling top sheet 102 (as it is conveyed by the first conveyor 110) first intersects the laser plane 240, the sensor detects the leading edge at an intersection point along the length of the laser plane 240. Of note, other types of sensors are contemplated. For example, a sensor emitting an array of laser beams, a pair of single-point laser sensors, cameras, etc., may be employed.

Notably, a distance between the laser plane 240 and the roller assembly 208 is fixed and known (e.g., input by a user or pre-programmed in the controller). Moreover, the conveyance speed of the incoming top sheet 102 and its dimensions are known (e.g., via user input, the sensor, or pre-programmed in the controller). Accordingly, with the above known information, the detected intersection point of the leading edge (corner) of the top sheet 102, as well as the angle of that leading edge discernible via monitoring the advancement of that edge for a short interval (e.g. measurable in microns or millimeters) just after the initial corner detected intersection, the controller performs the trigonometric calculations in order to ascertain the precise lateral and angular offsets (if any) of the sheet's center line 102a relative to the center line 116 of the machine. With these offsets known, the controller can activate the first and second actuators 210, 212 (either successively or concurrently) to adjust the lateral position and the angular orientation of the roller assembly 208 relative to the incoming top sheet 102 to correct those offsets via engagement by the roller(s) 226, as will now be described.

Figure 15:
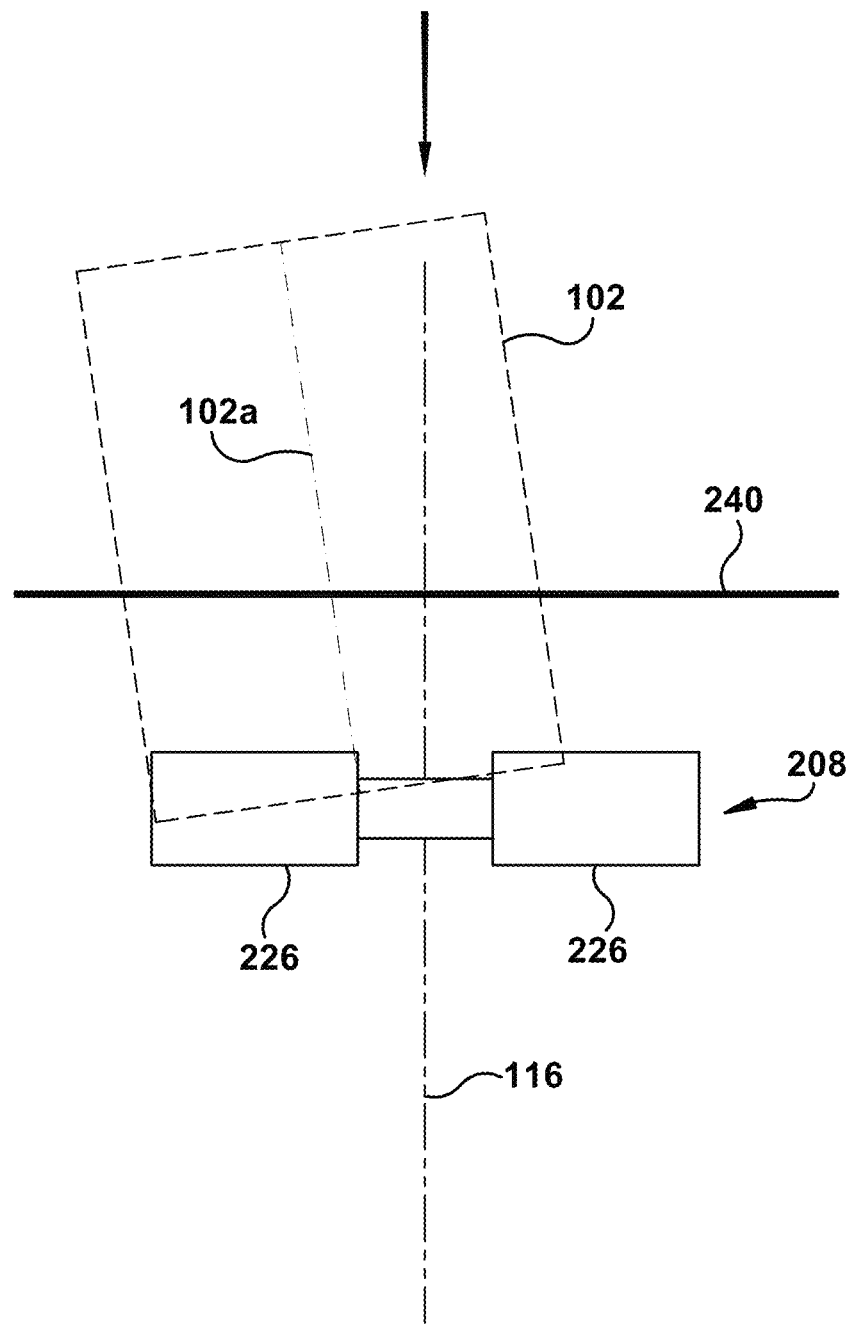
Figure 16:
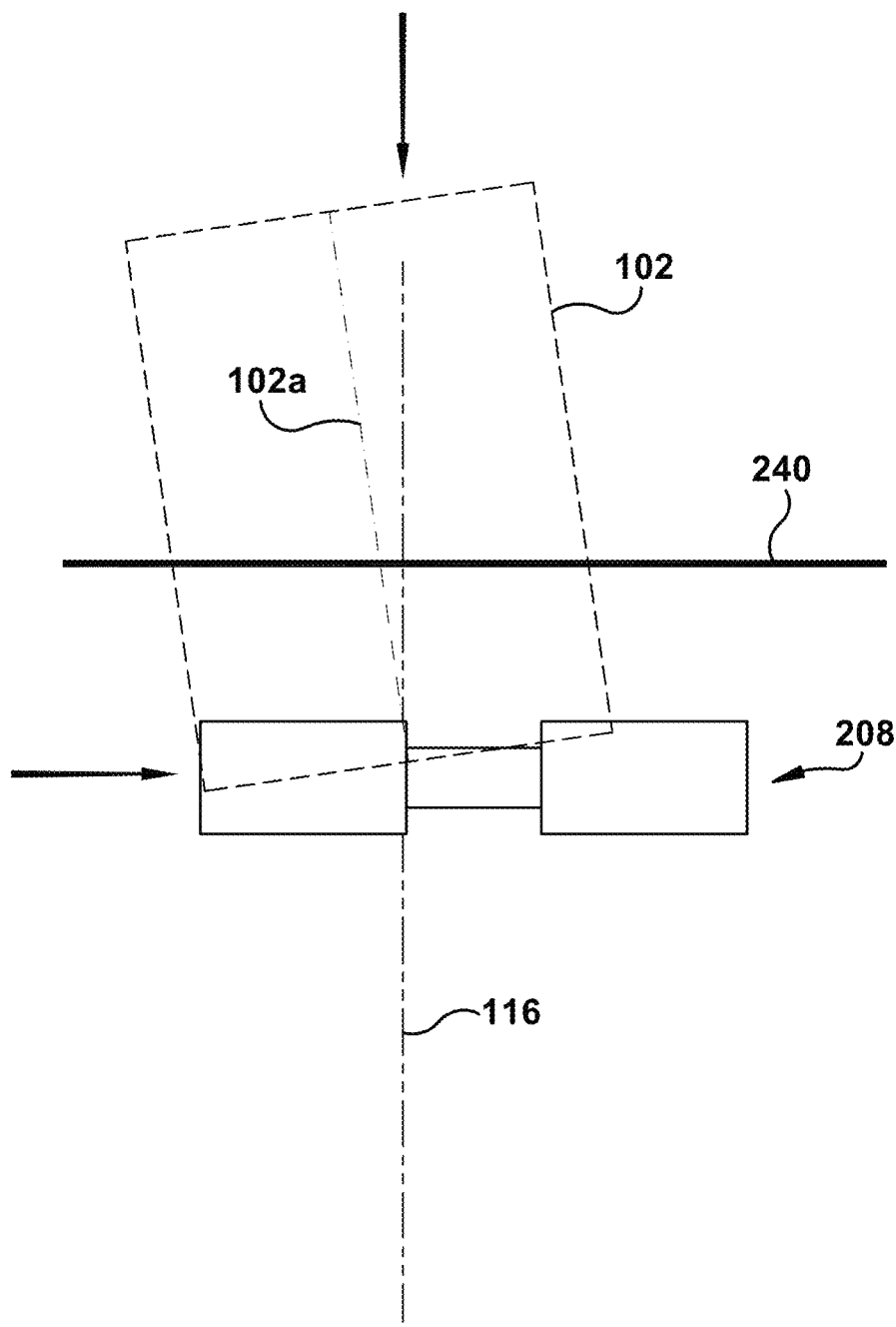

With reference to FIGS. 15-16, which schematically illustrate successive instants in the operation of the alignment device 200, as the leading edge of the top sheet 102 advances over and engages the roller(s) 226 of the roller assembly 208, the controller activates the first actuator 210 to linearly translate the roller assembly 208 in the cross-machine direction (as described above) to effectuate correction of the measured lateral offset—in order that said sheet 102 ends up where illustrated in FIG. 16. In order that such cross-machine translation of the roller(s) 226 merely adjusts the lateral position of the top sheet 102 and does not alter its angular orientation, there must be sufficient engagement between the top sheet 102 and the roller assembly 208 during translation of the roller assembly 208 so translation thereof merely 'pushes' the top sheet 102 and does not rotate it (e.g., such as when pushing against only the corner of a sheet of paper). Therefore, ideally cross-machine translation will not begin until the roller(s) 226 have engaged with the top sheet 102 against two distinct regions of that sheet 102 remote from one another; and preferably adjacent to the respective opposing lateral edges of that sheet 102 opposite the center line 102a. This is another reason it is desirable to use either a segmented roller 226 having a central recess in order to engage the top sheet 102 at two distinct, spaced apart locations, or alternatively two discrete and spaced rollers 226. Alternatively, it is contemplated that only a majority of one of the lateral side portions of the top sheet 102 may need engage the roller assembly 208 to hinder altering the sheet's angular offset.

Figure 17:
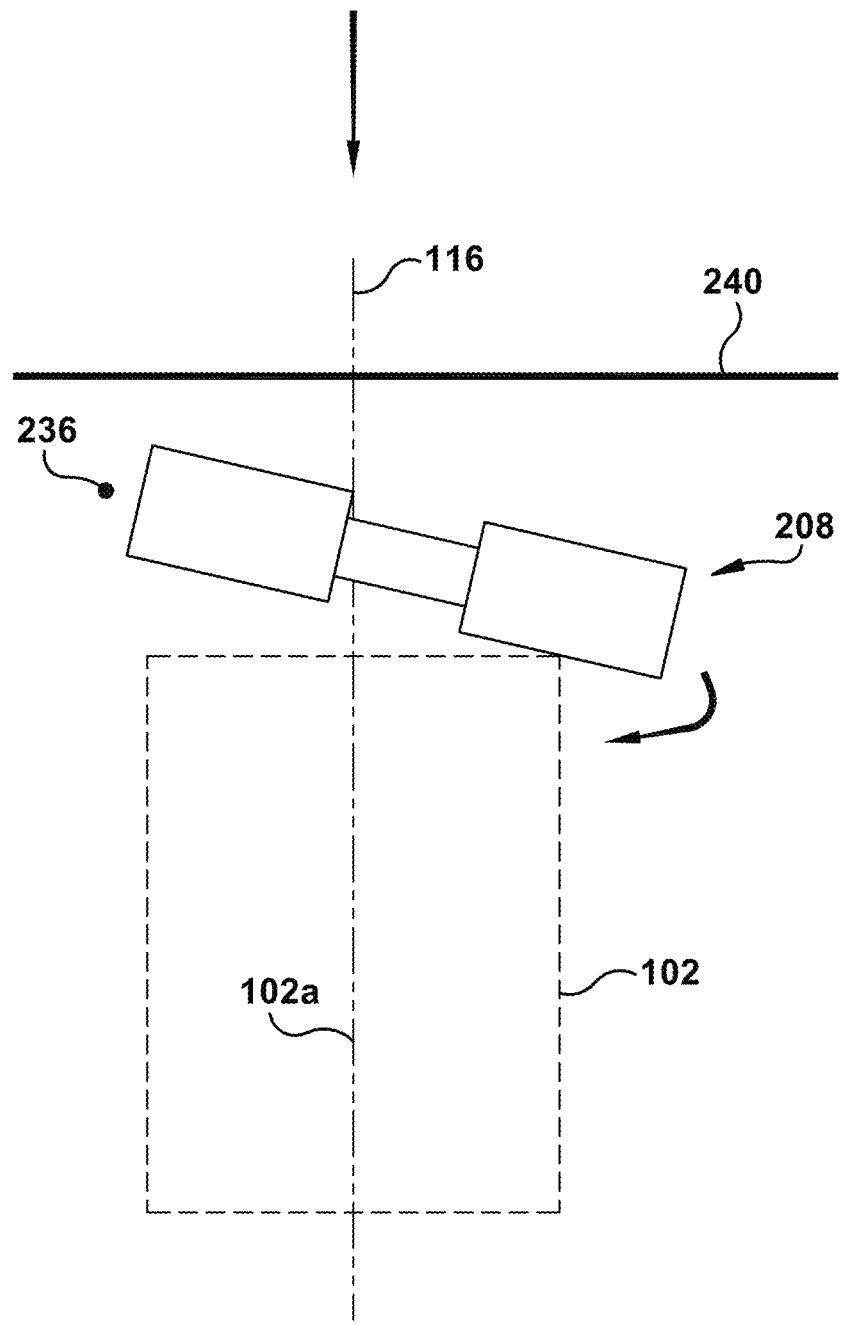

Now with reference to FIG. 17, which illustrates an instant immediately following that shown in FIG. 16 during operation, after (as illustrated-though optionally this operation can be carried out concurrent with) the desired correction of the sheet's lateral offset, the controller activates the second actuator 212 to pivot the roller assembly 208 about the pivot axis 236. With the top sheet 102 continuously moving over the roller assembly 208, the roller assembly 208 pivots either clockwise or counterclockwise (i.e., clockwise in the illustrated example) to correct the angular offset of the top sheet 102, so that at the end of the above described operations the top sheet 102 ends up in the orientation and lateral position as shown in FIG. 17.

Of note, both the initial lateral and angular offsets of the top sheet 102 (as measured) are considered by the controller when calculating the necessary degrees of adjustment, and then actuating the first and second actuators to effect those adjustments to correct both lateral and angular orientation of the top sheet 102. This is because adjustment of the lateral position of the top sheet 102 can affect the degree of angular alignment requiring correction to achieve the final desired alignment, and vice versa. So both should be considered and an overall calculation performed in order to determine the appropriate degrees of both angular and lateral adjustment to be effected by the respective actuators, so that when both adjustments are completed the top sheet 102 will have both the proper angular alignment and the proper lateral alignment.

Moreover, it is to be understood that the roller(s) 226 of the roller assembly is/are rotatably driven (via a motor) throughout the aforementioned adjustment process. To achieve the desired longitudinal alignment for each top sheet, the controller can adjust the speed of the roller(s) 226 as necessary to effectuate alignment of the leading edge of the top sheet 102 relative to the leading edge of the corresponding backing 104 as the latter is advanced along the second conveyor 112, in order to yield the desired longitudinal alignment/registration therebetween. In other words, the controller can adjust the rotational speed of the roller(s) 226 (which rotate at the same speed) to advance or retard the top sheet 102 along the conveyance direction relative to the corresponding backing 104 to ensure proper registration before adhering them together in the application station 114.

As noted, lateral offset of the top sheet 102 can be corrected prior to correcting the sheet's angular offset (e.g., relative to the center line 116 of the machine). However, it is contemplated that correcting the sheet's orientation to achieve desired registration relative to the corresponding backing can be achieved in a different manner. For example, the sheet's angular offset can be corrected prior to correcting the sheet's lateral offset. In such an example, the controller will first activate the second actuator 212 (to pivot the roller assembly 208), and then activate the first actuator 210 (to linearly translate the roller assembly 208). In another alternative, the sheet's lateral and angular offsets can be corrected simultaneously by activating the first and second actuators concurrently to both laterally translate and pivot the roller assembly 208.

Figure 18:
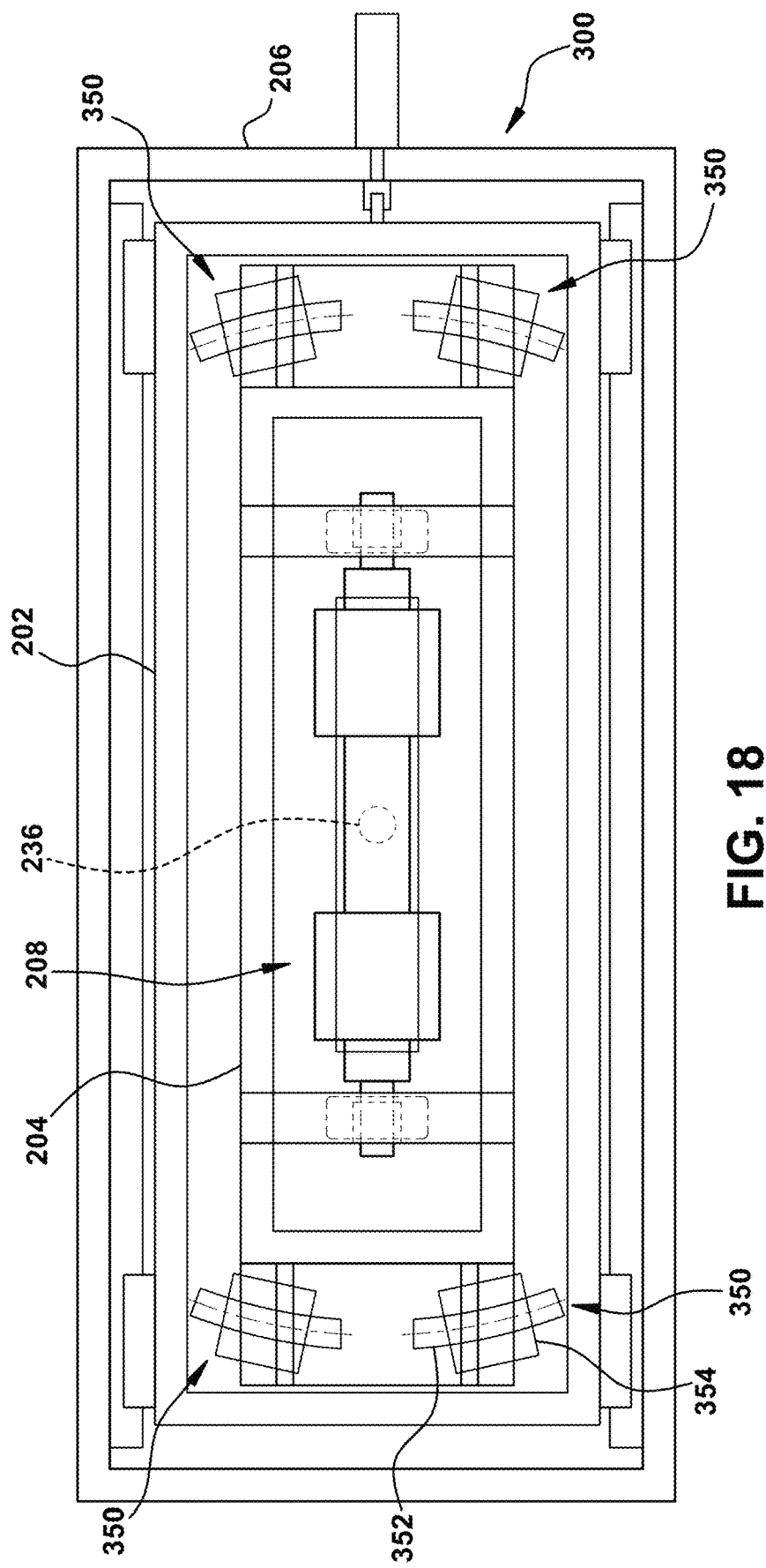
FIGS. 18-19 schematically illustrate a second embodiment of an alignment device as herein disclosed.
Figure 19:
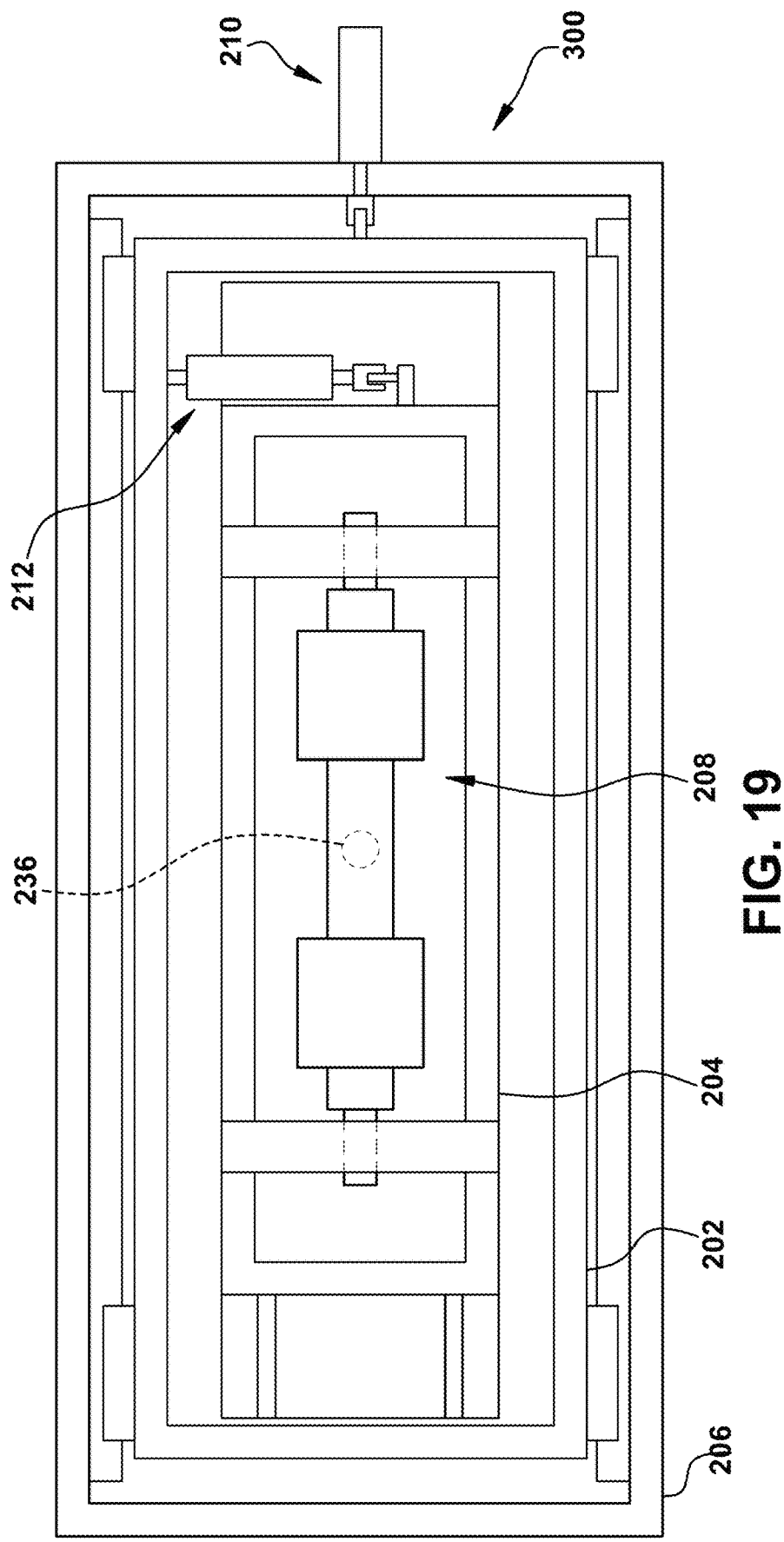

With reference to FIGS. 18-19, illustrated is a second embodiment of an alignment device 300. Notably, this alignment device 300 is substantially similar to the alignment device 200 described above. That is, the alignment device 300 includes the nested frame assembly as described above, wherein the intermediate frame 202 is linearly translatable relative to the outer frame 206 via a first actuator 210, and wherein the inner frame 204 (and thus the roller assembly 208) is pivotable relative to the intermediate frame 202 via the second actuator 212.

Figure 20:
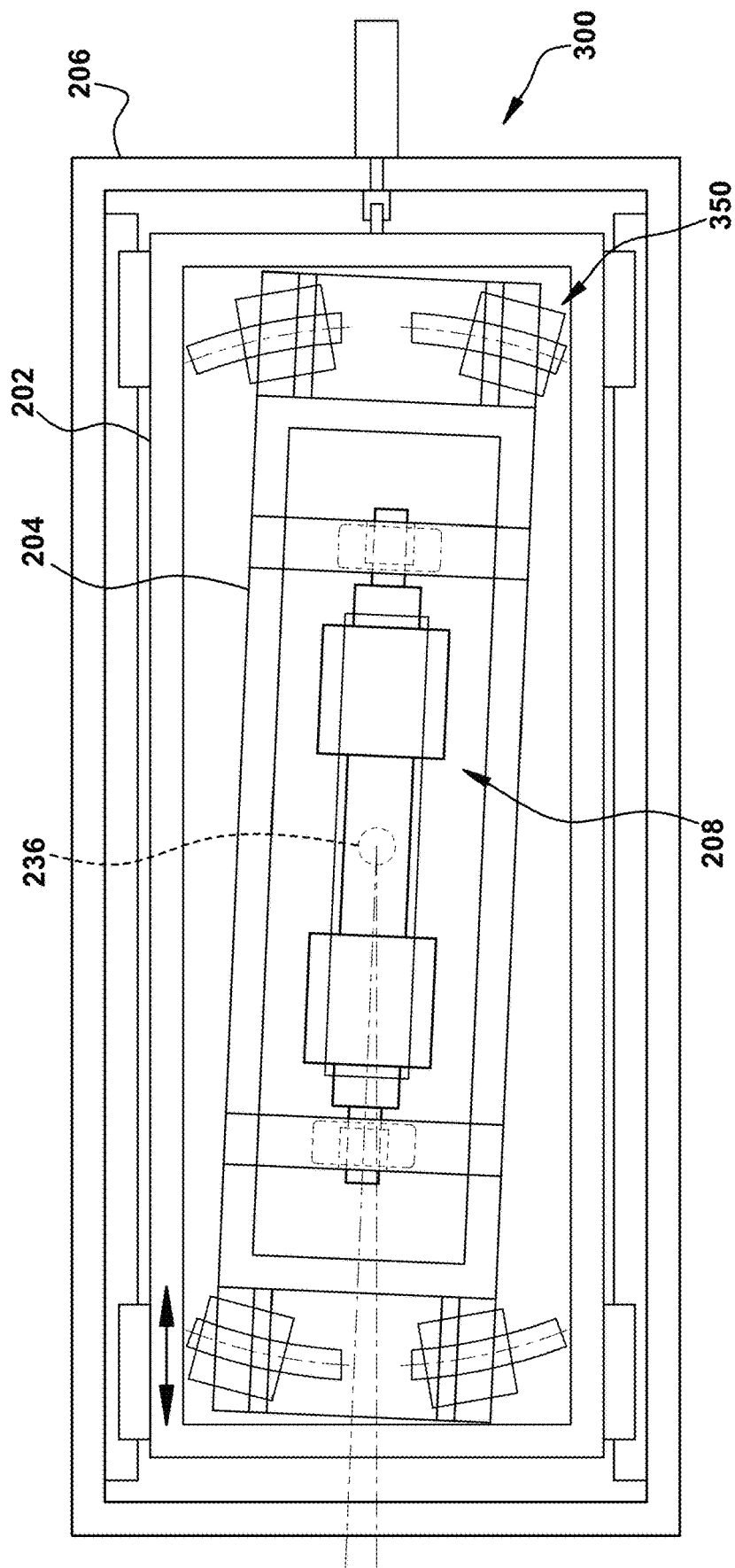
FIGS. 20 and 21 show schematic representations of different states of pivotable orientation of the roller assembly 208 in the alignment device shown in FIGS. 18-19.
Figure 21:
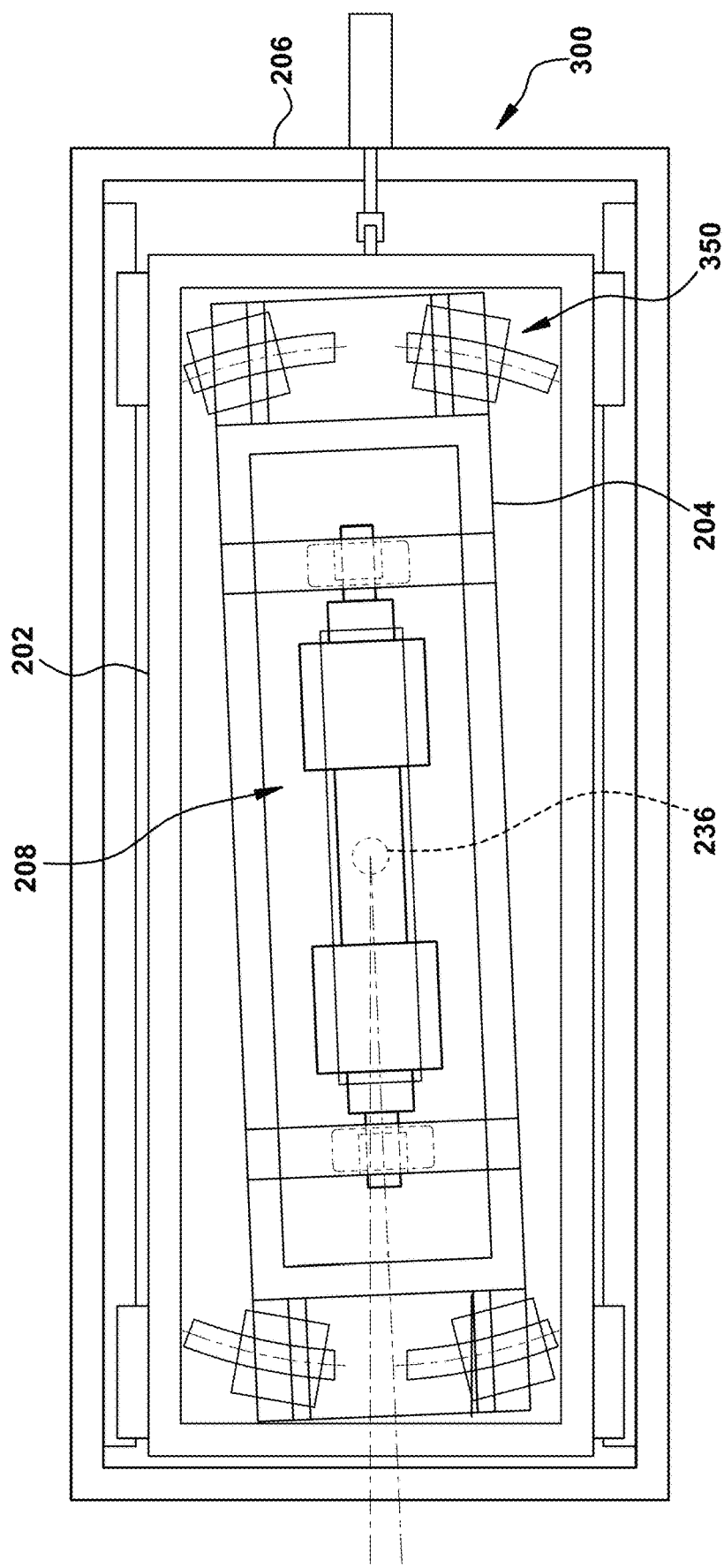
Figure 22:
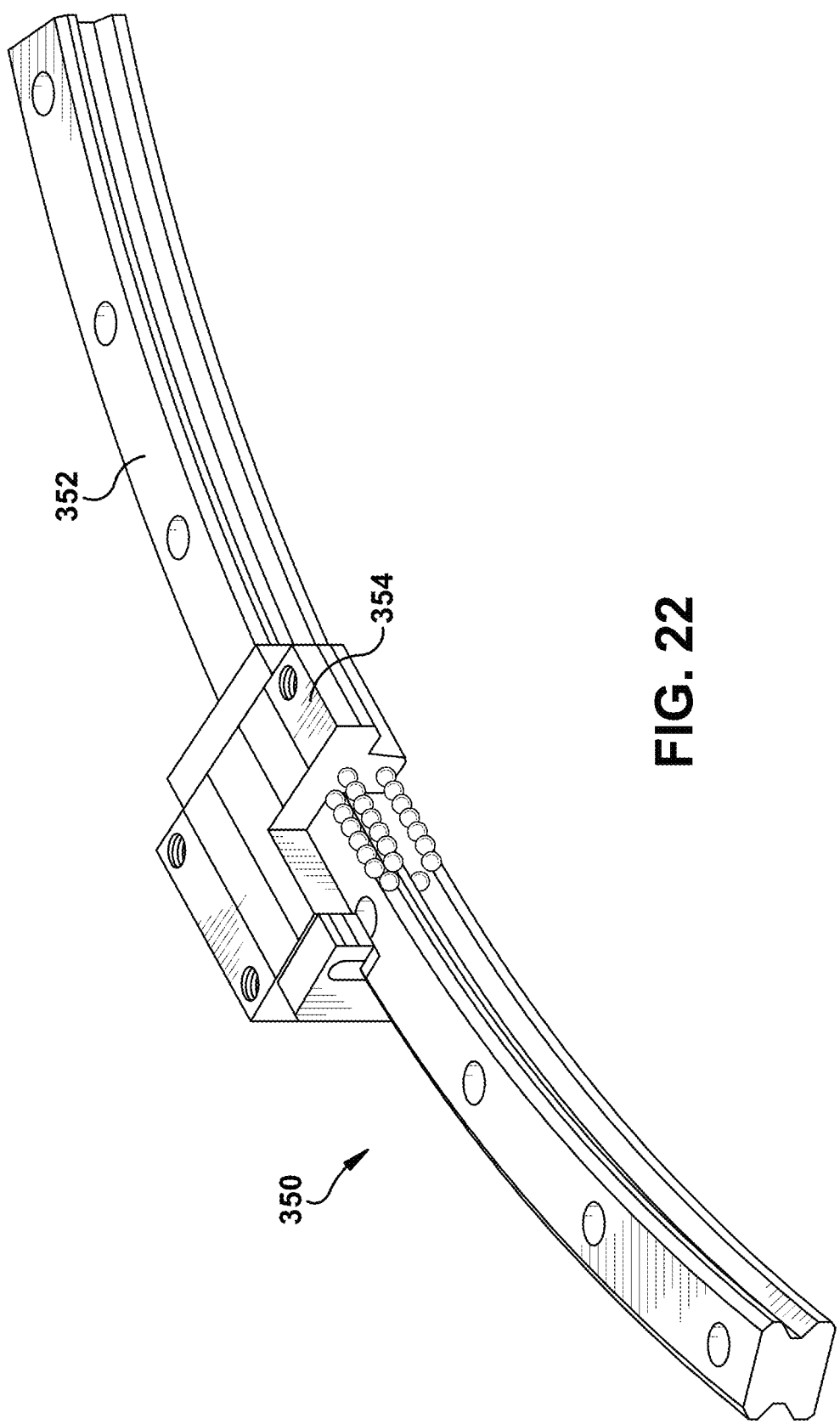
FIG. 22 illustrates an example rotary guide bearing as can be used in the aforementioned second-embodiment alignment device to facilitate the pivotable movement of the roller assembly as shown in FIGS. 20-21 above.

The differences between this alignment device 300 and the prior described alignment device 200 are the interconnection between the inner frame 204 and the intermediate frame 202 and the location of the pivot axis 236 about which the roller assembly 208 pivots. With respect to FIG. 18, one or more rotary guide bearing(s) 350 (see FIG. 22 for an example of a conventional rotary guide bearing) is/are provided at or near each of the lateral edges (for example one adjacent to each of the four corners) of the inner frame 204, and located outside of the inner frame 204. Each rotary guide bearing 350 includes a curved rail 352 attached (directly or indirectly) to the intermediate frame 202, and a carriage 354 attached to the inner frame 204. The carriages 354 are movable (i.e., slidable) along their respective rails 352 to effectuate pivoting of the roller assembly 208 (as shown in FIGS. 20-21). In this embodiment, by fixing the inner frame 204 so that it can be pivoted only insofar as the respective carriages 354 affixed thereto can slide along their respective rails 352, the pivot axis of the inner frame 204 also can be fixed to correspond to the geometric center thereof, rather than adjacent to or even outside of a lateral end of that frame 204. More specifically, the rotary guide bearings 350 are located such that the pivot axis 236 is positioned at a center of the roller assembly 208 as seen in the figures. Meanwhile, the second actuator 112 still engages the inner frame 204 adjacent to an end thereof in order to pivot that frame. But with the pivot axis now fixed at the center of the inner frame 204, activation of the second actuator 112 causes the inner frame 204 (and roller assembly 208) to pivot relative to their center, rather than to swing relative to an offset axis.

As mentioned above, the alignment device (i.e., either the first or second described embodiment) preferably is located at an inclined portion of the first conveyor (as shown in FIG. 13). Using the alignment device 300 of the second embodiment described above, having its corresponding center-pivot configuration, the load of the roller assembly 208 is balanced and symmetric with respect to the axis of rotation (i.e., the pivot axis 236). As such, the second actuator 212 need not overcome the force of gravity (either additive or subtractive depending on the direction of pivotal adjustment) when actuating pivotal movement of the inner frame 204 and the nested roller assembly 208—as would be the case for the first embodiment above, wherein the inner frame 204 is effectively cantilevered from an offset pivot axis so that the actuator 112 effective must lift or lower the frame 204, and its weight, cantilevered from the offset pivot axis. Rather, in the second embodiment of the device 300 shown in FIGS.

18-19, as a left half of the inner frame 204 (and roller assembly 208) is raised relative to the central pivot axis, the right half thereof is lowered relative to gravity. These counter-acting gravitational forces effectively cancel one another out so that the second actuator 112 need not overcome gravitational force acting on the inner frame 204 (and roller assembly 208) in order to pivot them in response to control inputs.

This can be highly desirable in the instant applications because the contemplated degrees of required angular adjustment are likely to be quite small—on the order of single-digit degrees—and the speed at which such adjustments will have to be made for successive top sheets 102 advanced along the first conveyor 110 is quite fast; e.g., at or even greater than 13,000 such successive adjustments per hour (i.e. on the order of four or more angular adjustments of successive top sheets 102 per second). Because the second actuator 212 will not have to compensate for (i.e., overcome) the force of gravity on the inner frame 204 and roller assembly 208 as they are pivoted (because gravity will act equally at opposite sides thereof relative to the pivot axis 236, and will thus be nulled as one end moves upward and the other one down), a substantial component of cyclic inertia against which the second actuator 212 must act is removed. As a result, greater speeds (i.e. lower cycling times), resulting in a larger number of corrections per hour, and thus of line speed, can be achieved. It is contemplated that adjustment resolution also will be materially improved because the degree of force required to make minute adjustments will be reduced when gravity is nulled out of those adjustments. Further still, with the pivot point located at the center of the inner frame 204, the magnitude of linear actuation required to achieve the same degree of angular adjustment (assuming similar positioning of the second actuator 212) will be about half compared to when the pivot point is located adjacent to an edge of the inner frame 204; because the point where the actuator 112 engages the inner frame 204 is roughly half the distance from a central pivot axis as in the second disclosed embodiment, as compared to in the first disclosed embodiment. Accordingly, the second actuator 212 not only will face lower loads and lower inertia when making adjustments, but it also will require small-magnitude actuations when making those same, cyclic adjustments compared to the first embodiment. These differences compared to the first embodiment can yield much faster cycling times, as well as less wear and greater reliability on at least the second actuator 212. Using the disclosed alignment device it is contemplated that line speeds of at least 13,000 top sheets per hour can be achieved, more preferably at least 15,000 top sheets per hour, more preferably still at least 16,000, 17,000, 18,000 or 20,000 top sheets per hour. It is contemplated that the disclosed device will enable line speeds of 13,000 to 18,000 top sheets per hour.

The invention has been described with reference to example embodiments. Modifications and alterations thereto will be evident to persons of skill in the art upon a reading and understanding this specification.

What is claimed is:

1. An alignment device for aligning a top sheet relative to a corresponding backing, the alignment device comprising:
    a roller assembly having one or more rollers aligned along a roller axis and adapted to be driven by a motor, said roller assembly being both translatable and pivotable within predefined limits in a plane comprising said roller axis;
    a translatable first frame; and
    a second frame fixed in translation relative to the first frame and being independently pivotable with respect thereto,
    said roller assembly being attached to the second frame, and
    said second frame being nested within a central opening of the first frame such that said first frame and said second frame are substantially coplanar.

2. An alignment device for aligning a top sheet relative to a corresponding backing, the alignment device comprising:
    a roller assembly having one or more rollers aligned along a roller axis and adapted to be driven by a motor, said roller assembly being both translatable and pivotable within predefined limits in a plane comprising said roller axis;
    a translatable first frame;
    a second frame fixed in translation relative to the first frame and being independently pivotable with respect thereto, said roller assembly being attached to the second frame; and
    a third frame wherein the first frame is supported by the third frame and is translatable relative thereto, wherein the first, second and third frames are nested such that said first frame is disposed within a central opening of the third frame, and the second frame is disposed within a central opening of the first frame.

3. The alignment device of claim 2, wherein the first, second and third frames are substantially coplanar.

4. The alignment device of claim 1, further comprising a first actuator configured to translate the first frame.

5. The alignment device of claim 4, further comprising a second actuator configured to pivot the second frame about a pivot axis relative to the first frame.

6. The alignment device of claim 5, wherein the pivot axis is offset from the roller assembly.

7. The alignment device of claim 5, wherein the pivot axis is substantially centered with respect to the roller assembly.

8. The alignment device of claim 1, further comprising a first actuator adapted to translate the roller assembly along a cross-machine direction, and a second actuator adapted to pivot the roller assembly relative to a pivot axis that is substantially centered with respect thereto.

9. A laminating machine comprising a first conveyor and a second conveyor, the second conveyor being disposed above the first conveyor and having a convergent portion that follows a convergent path downward toward the first conveyor, and toward an application station where top sheets conveyed along the second conveyor can be laminated to backings conveyed along the first conveyor, and the alignment device of claim 1 disposed along the convergent portion of the second conveyor such that top sheets conveyed along the second conveyor will pass over and be engaged by the one or more rollers of said roller assembly.

10. The laminating machine of claim 9, said alignment device further comprising a first actuator adapted to translate the roller assembly along a cross-machine direction, and a second actuator adapted to pivot the roller assembly relative to a pivot axis.

11. The laminating machine of claim 10, said pivot axis being substantially centered with respect to the roller assembly in order that effects of gravity on pivoting the roller assembly are nullified and need not be overcome by the second actuator when activated to pivot said roller assembly.

12. The laminating machine of claim 9, further comprising a third frame wherein the first frame is supported by the third frame and is translatable relative thereto, wherein the first frame is disposed within a central opening of the third frame.

13. A method for manufacturing a multilayer composite comprising the steps of:
   a) conveying a backing toward an application station;
   b) conveying a top sheet along a conveyance direction, also toward said application station in order that the top sheet can be laminated to the backing, wherein said top sheet initially is laterally, angularly and/or longitudinally offset relative to the backing;
   c) detecting said lateral and angular offsets, if present;
   d) translating and/or pivoting the roller assembly of the alignment device of claim 1 to adjust the top sheet to correct any detected lateral and angular offsets of the top sheet relative to the backing;
   e) thereafter detecting said longitudinal offset, if present, and correcting any detected longitudinal offset by advancing or retarding the top sheet along the conveyance direction relative to the backing; and
   f) thereafter adhering said top sheet to said backing.

14. The method of claim 13, comprising repeating steps (a)-(f) for successive pairs of a top sheet and a corresponding backing at a rate of at least 13,000 top sheets per hour.

15. The method of claim 14, said rate being 13,000 to 18,000 top sheets per hour.

16. The method of claim 14, wherein successive ones of said top sheets pass over and are engaged by said roller assembly, said one or more rollers being disposed along the conveyance direction, and wherein any detected lateral offsets in the successive top sheets are corrected by successive cross-machine direction linear translations of the roller assembly as it is engaged with each of the successive top sheets.

17. The method of claim 16, wherein any detected angular offsets in the successive top sheets are corrected by successive pivoting movements of the roller assembly as it is engaged with each of the successive top sheets.

* * * * *